United States Patent [19]

Lia

[11] Patent Number: 4,980,763
[45] Date of Patent: Dec. 25, 1990

[54] SYSTEM FOR MEASURING OBJECTS VIEWED THROUGH A BORESCOPE

[75] Inventor: Raymond A. Lia, Auburn, N.Y.

[73] Assignee: Welch Allyn, Inc., Skaneateles Falls, N.Y.

[21] Appl. No.: 364,883

[22] Filed: Jun. 12, 1989

[51] Int. Cl.⁵ .............................. A61B 1/04; A61B 1/06
[52] U.S. Cl. ............................................ 358/98; 128/6; 358/107
[58] Field of Search .................. 358/98, 107; 128/6

[56] References Cited

U.S. PATENT DOCUMENTS

| | | | |
|---|---|---|---|
| 4,491,865 | 1/1985 | Danna | 358/98 |
| 4,621,284 | 11/1986 | Nishioka | 358/98 |
| 4,656,508 | 4/1987 | Yokota | 358/98 |

Primary Examiner—Howard W. Britton
Attorney, Agent, or Firm—Wall and Roehrig

[57] ABSTRACT

This is a device for measuring objects viewed with a borescope by creating an auxiliary image such as a shadow, and projecting it on the object from the general illumination source in a way that its video image changes position or size in proportion to the distance of the image sensing head from the object. A pre-calibrated object magnification and distance overlay for the geometry of the borescope is placed on the video display to indicate the modification factor for the physical measurement of the object on the display screen. Alternatively, electronic calibration and measurement circuitry is provided.

19 Claims, 5 Drawing Sheets

SYSTEM FOR MEASURING OBJECTS VIEWED THROUGH A BORESCOPE

BACKGROUND OF THE INVENTION

This invention relates generally to a borescope or endoscope for providing a full color video image of a generally inaccessible object, and more particularly to a system for measuring the size of objects viewed on the video image display of the borescope.

Various devices have been provided in the prior art for realizing a full color video picture of a target situated within a remote cavity. These devices have been gradually improved over time to where today most devices of this type employ an external light source conveyed to the image head by fiber optic bundles together with a solid state image sensor and lens system positioned in the distal end of the insertion tube of the borescope/endoscope connected to an external video display. A particularly compact head including a light source and solid state image sensor lens system of this type is shown in U.S. Pat. No. 4,491,865 to Danna et al. which patent is owned by a common assignee of the present applicant.

Generally, in systems of this type, the fiber optic illumination bundle and the image sensor and optical system are disposed side by side in the end of a small insertion tube adapted to be inserted in cavities for viewing objects therein. The light provided by the fiber optic bundle has a field of view slightly displaced from the optical field of view of the image sensor, but generally overlapping sufficiently to provide an effective field of vision for the device. The image detected by the image sensor is displayed on a video screen and will vary in magnification, apparent size, and detail, depending upon how close the end of the insertion tube carrying the lens system is from the object being viewed. Generally speaking, devices of this type have a depth of field from an eighth of an inch to something over one inch. The real close images, of course, have the greatest magnification and the more distant images the least.

Heretofore, all attempts to measure the image on the video display to determine the size of the object being viewed have had to rely on either the placing of a known scale adjacent to the image to be measured for a comparison measurement, or the provision of a physical standoff over the lens on the end of the borescope insertion tube at which point the magnification is known and then actually adjusting the end of the borescope until it just touches the object to be viewed at the standoff. With this known magnification, the image can be measured on the screen and the precise size determined.

OBJECTS AND SUMMARY OF THE INVENTION

Obviously, this method of measurement has been somewhat awkward and time consuming and it is therefore an object of the present invention to provide a system for measuring objects viewed with a borescope video sensor and lens system that allows measurement without the necessity of placing scales adjacent the object to be measured or use of physical standoffs to determine the object distance from the lens system.

It is another object of the present invention to provide an object measuring system that is self-contained and integral with the illumination and sensor systems of a borescope.

It is a further object of the present invention to provide an object measuring system for a borescope or the like that can be operated entirely externally of the cavity into which the borescope insertion tube is placed.

It is a further object of the present invention to provide an object measuring system for measuring the size of an object directly off the video display screen of a borescope.

It is a further object of the present invention to provide an illumination system for a full color video image device that additionally provides a measuring indicator for determining object distance from the lens assembly of the video imaging device.

It is further object of the present invention to provide an illumination system including a shadow creating means for automatically indicating the object distance on a video display screen.

It is a further object of the present invention to provide an illuminating system for use in a video imaging device that includes projecting an image of known size and shape through the viewing field of the imager device so that the image size on the video display screen will indicate the object distance from the lens system.

It is a further object of the present invention to provide an illumination system for general illumination of the object to be viewed and for special measurement illumination of a known pattern that will indicate magnification, and thus object distance from the lens assembly.

It is a still further object of the present invention to provide an object measuring system for electronically measuring the size of an object being viewed with a borescope It is yet a further object of the present invention to provide an illumination system for a video imaging device in which a constant size ring image is projected on the object to be measured so as to indicate object distance from the lens system.

BRIEF DESCRIPTION OF THE DRAWING

These and other and further objects of the invention, together with additional features and advantages accruing therefrom will be apparent from the following description of a preferred embodiment shown in the accompanying drawings in which like reference numerals indicate corresponding parts throughout wherein.

DETAILED DESCRIPTION OF THE INVENTION

Figure 1:
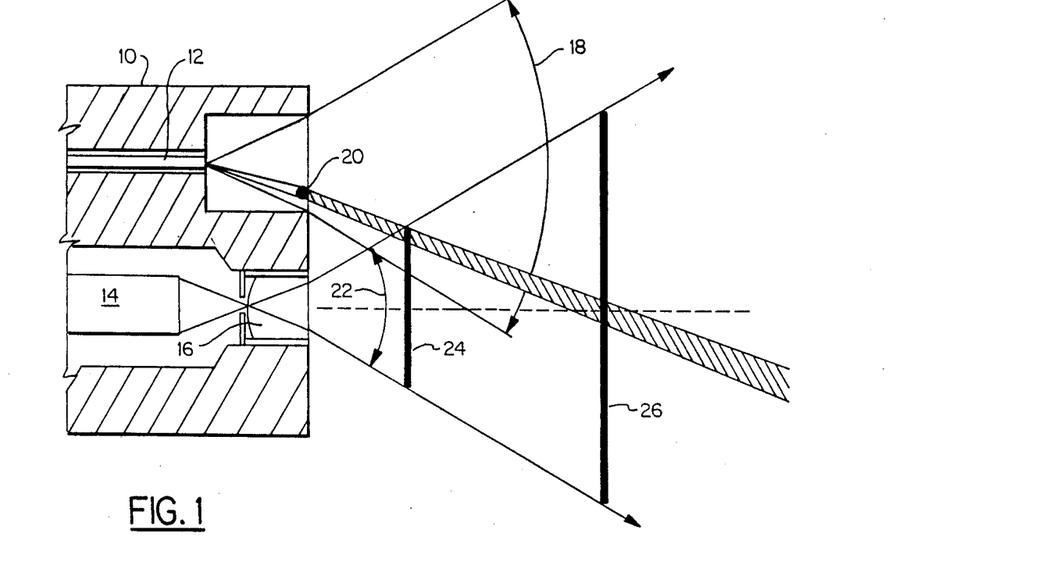
FIG. 1 is a partial sectional view of the imager head of a borescope according to the present invention showing in diagrammatic form the principles of the present invention.

Referring now to FIG. 1 there is shown a borescope imager head 10 having a fiber optic illumination source 12 and a video image sensor channel 14 with associated lens system 16 positioned in the end of the insertion tube of a borescope. As described in the prior art, the optical fiber source 12 provides a general illumination which may be single or full color and which illuminates an area shown diagramatically as arc 18 emanating from the face of the fiber optic source. The field of view of the imaging device is determined by the lens system and its juxtaposition with the solid state sensor device, and is represented by arc 22 in FIG. 1. In the particular embodiment of the present invention, the fiber optic source is configured in a thin strip 19 shown in FIG. 2 extending across the fiber optic channel in a planar fashion. This configuration provides enough general illumination in as fully an effective manner as the more conventional circular fiber bundles. Positioned a spaced distance in front of the termination of the fiber optic thin strip 19 is an opaque index element or bar 20 which extends the full width of strip 19 and casts a shadow image from the illumination emanating from the fiber optic strip onto the objects being viewed. The standard lens system generally is shown directly below the illumination system in FIG. 2.

Figure 3:
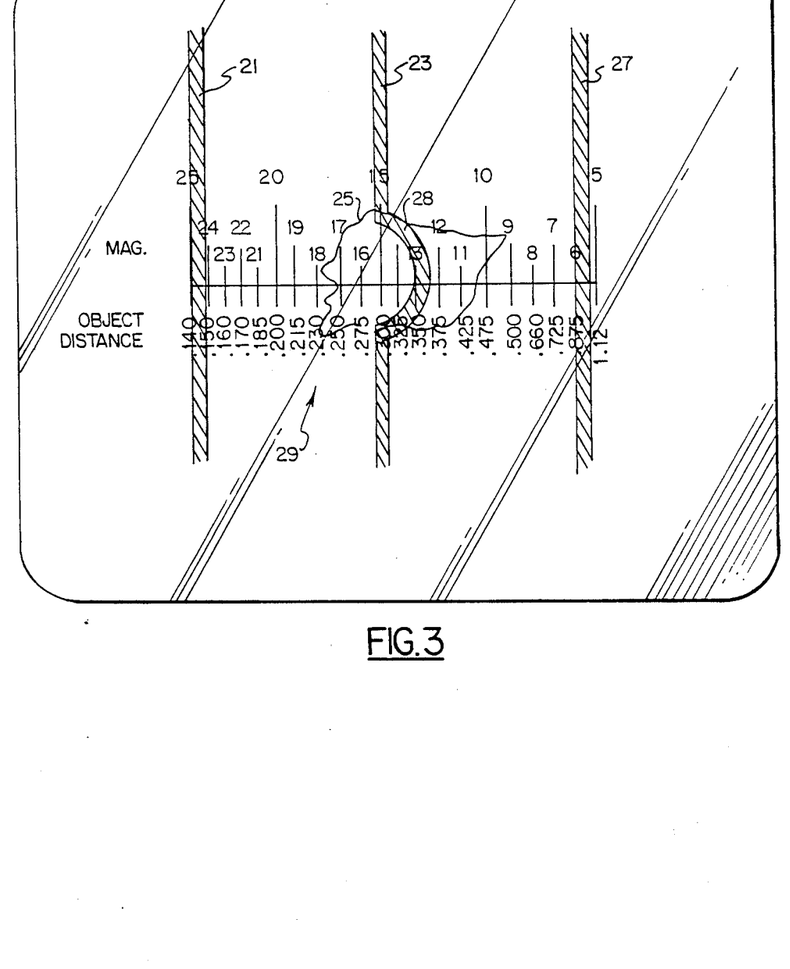
FIG. 3 is an elevation of a display screen and calibrated scale for particular imaging system showing the relationship between magnification and object distance from the image detecting lens system.

The shadow cast by index bar 20 will fall on objects within the field of view of the imager channel 14 depending upon how far the object is from the imager lens. An object near the lens such as at line 24 will have the shadow 21 from bar 20 close to the edge which, in FIG. 3 is translated to the left edge of the screen. An object farther away from the lens such as at line 26 will have the shadow from bar 20 falling further down in FIG. 1 or to the right in FIG. 3 and when the image of the object is projected on the display screen, the shadow will be displaced to the right such as shadow 23 in FIG. 3. Shadow 27 represents the limit of the measurement range of the borescope.

An object located at line 24 will appear on the video display as a relatively large object, while the same object at line 26 will appear quite small on the display. The shadow 23 will actually be wider in the line 26 display than the shadow 21 in the line 24 display because of the divergence of the light from fiber optic strip 19. The shadow will appear to remain substantially the same width as it traverses across the display.

Referring now to FIG. 3 there is shown a video display screen for the imager system of the borescope head. Shown in an overlay on the screen is a magnification and object distance scale 29 calibrated for the particular display screen based on the geometry of the particular borescope head, illumination source, imager lens, and detector system. The particular calibration shown is for a thirteen inch video display screen and a borescope head illumination pickup system wherein when the imager head is placed approximately an eighth of an inch from the screen, the magnification of that image is something on the order of twenty-five times actual size when displayed on the video display screen. Conversely, when the imager head is about half an inch from the object being viewed, the magnification will be reduced to a factor of about nine. The maximum depth of vision for borescopes of this type is something in the neighborhood of one inch which, in this configuration, yields a magnification of about five.

Referring again to FIG. 1, it will be seen that the shadow bar 20 is positioned off-center of the illumination field so that it will cast a shadow across the field of view of the lens system at different positions from left to right on the display screen of FIG. 3 and as represented in FIG. 1, from top to bottom. Thus, as shown diagramatically in FIG. 1, the shadow 21 when looking at an object placed at the position of line 24, will just touch the edge of the field of view and it will appear on the left side of the display screen of FIG. 3. If the above lens system for picking up the image is spaced only 0.1 inches or so from the object itself, the image will be highly magnified on the display screen of FIG. 3. The shadow created by shadow bar 20 will be all the way to the left of the presentation in FIG. 3, indicating that the image pickup lens system is approximately 0.140 of an inch from the object being viewed in this system. The scale in FIG. 1 has been exaggerated for clarity of presentation, but the actual numbers for a particular borescope and display screen are as indicated on the overlay in FIG. 3.

Looking again at FIG. 1, it will be seen that as the field of view of the image device and lens system expands, as you go further from the face of the lens, the shadow created by the shadow bar 20 from the light source 12 will appear to move to the right on the display screen or to the bottom of FIG. 1. The distance that this shadow moves from top to bottom in FIG. 1 or left to right in FIG. 3 is proportional to the distance the object being viewed is from the face of the lens system. This geometric distance has been related, for the specific embodiment of the present invention as shown in FIGS. 1 and 3, to the overlay on the screen which shows in scale form the magnification and object distance for this system from the very closest visualization to the most distant, for this particular light source and lens system. It is thus possible to determine the distance from the object being viewed to the lens face by noting where the shadow falls on the calibrated scale. This will translate into inches, and at the same time it will indicate the magnification of the object at the particular location of the shadow.

The system described can be used in a variety of ways to make measurements of objects being viewed. To make a measurement in the plane of the image of an object i.e., a plane at right angles to the axis of the lens system, the first step would be to note the area where the shadow falls on the image of the object being measured. If for instance the shadow falls at the location on the display screen at ten magnification, which means that the lens system is 0.475 inches from the object being viewed and that the object is magnified ten times larger than it actually is, then by measuring the image of the object on the display screen with vernier calipers or similar measuring device and dividing by ten, the actual size of the object being viewed by the borescope will be obtained.

Similarly, if the object being measured is a hole or a scratch 25 or other depression in the surface, there will be found a "blip" 28 in the shadow line, and instead of being a straight line as shown at 24, it will be a notched or displaced line, as shown at 28 in FIG. 3. The difference between the main portion of the shadow 26 and the displaced blip 28, when measured on the calibrated scale of distance, will show the depth of the indentation. If the actual surface dimensions of the depression are desired, they can be physically measured on the display screen with a vernier caliper or other scale and then divided by the magnifications indicated at the location of the shadow on the scale to obtain the actual physical surface size of the depression.

In another embodiment of the present invention, instead of physically measuring the size of the image on the display screen, one may electronically measure the object by use of one or more cursors that may be set at each edge of the object. Thus, as may be seen in FIG. 4, if the object 30 is to be measured, a first cursor 32 is positioned at the left edge and a second cursor 34 is positioned at the right edge. The pixels between cursors 32 and 34 are then electronically counted, translated into inches or other suitable measurement, and displayed on the viewing screen or recorded as the case may be. The size translation is accomplished by noting the position of the shadow and the magnification which is used to convert the pixels to physical dimensions. Electronically this can be done by a first step of positioning cursor 32 at the shadow and electronically counting pixels from the left edge of the screen to the cursor 32. While the foregoing examples have been shown with the shadow created by shadow bar 20 moving from left to right in FIG. 3 or top to bottom in FIG. 1, the system could be set up so that the shadow would move from top to bottom in FIG. 3 or any other convenient arrangement.

Figures 5, 6:
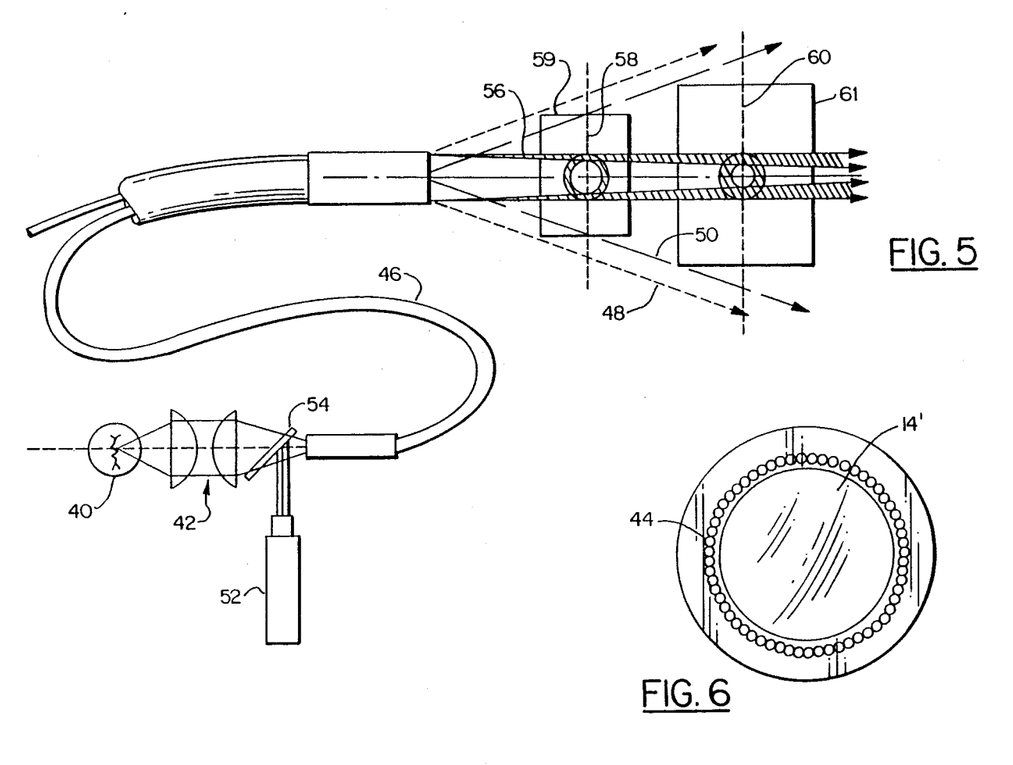
FIG. 5 is a schematic and diagrammatic representation of another embodiment of the present invention.
FIG. 6 is an enlarged end view of the imager head of a borescope in accordance with the invention of the embodiment of FIG. 5.
Figure 7:
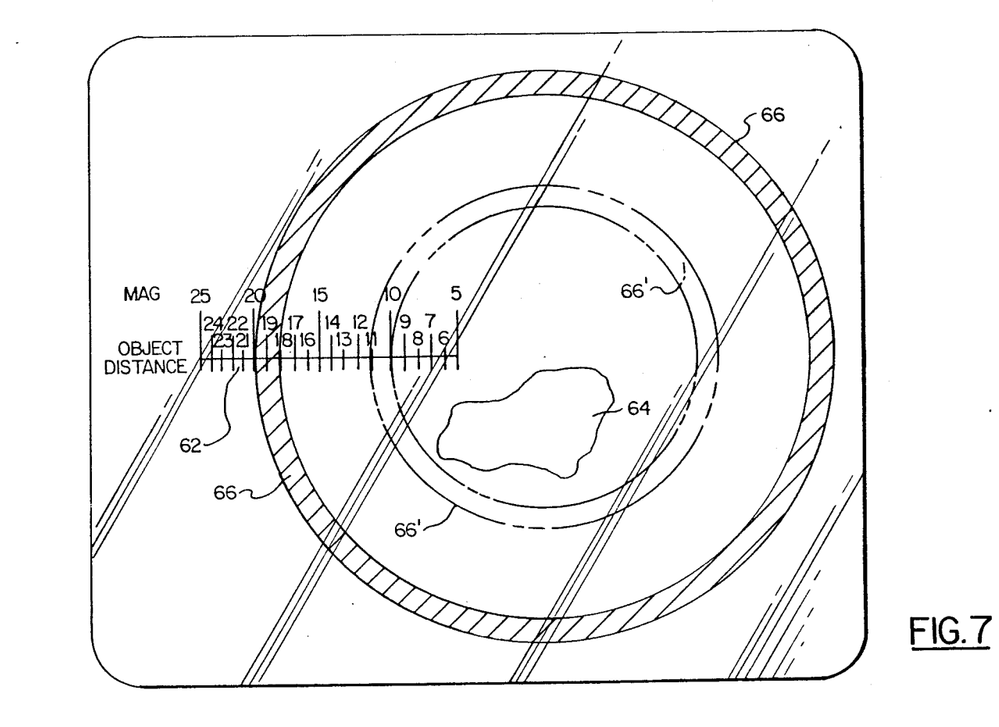
FIG. 7 is a display screen showing the use of the embodiment of FIGS. 5 and 6 for measuring objects on the display screen.

Referring now to FIGS. 5, 6, and 7, there is shown another embodiment of the present invention. This embodiment involves the projection of a constant diameter ring image of a known diameter out of the head of the borescope and into the viewing field of imager channel 14' so as to impinge on the object to be viewed at whatever distance it may be from the borescope head. By projecting a constant diameter ring, the apparent size of the ring will change at the video display as the borescope head is moved from very closely adjacent the object to the maximum distance the image can be seen. However, as shown in FIG. 7, we will now have a center which is the zero point and the extremities which are the maximum magnification.

By noting the apparent size of the ring as projected on the display screen, one can determine the magnification, and by measuring the size of the object on a display screen and dividing by the magnification, the actual dimension of the object being measured can be determined. The concept is similar to that shown in FIGS. 1-3, namely by noting the change in diameter on the display screen of the ring instead of the displacement of the shadow from left to right, the distance to the object from the lens system is known and directly related through the geometry of the system to the magnification of the object being viewed and thus, the actual physical size of the object being viewed.

In this embodiment, shown in FIG. 5, there is provided a general illumination source 40 which is fed through a lens system 42 to circular fiber optic bundle 44 (FIG. 6) extending through the insertion tube 46 to the image head of the borescope. This source 40 provides general illumination throughout the field of view of the borescope as shown by the dotted lines 48 in FIG. 5. The video imager field of view is indicated by lines 50.

Superimposed upon this general illumination is a source 52 of coherent laser-like light which is projected via mirror 54 through the fiber optic cable 46 to the borescope head. The laser light emerges from the head in a coherent circular beam 56 of light the diameter of which remains essentially constant throughout the depth of field of the borescope. The general source of illumination is emitted from the circular fiber optic termination so that it provides a broad cone of illumination for the target area of the objects to be viewed. The laser light, which is colored for easy detection, is superimposed on the general illumination, and appears on top of the general image of the object being viewed at the video display.

As can be seen in FIG. 5, as this ring is projected upon the image of the object being viewed at the display screen, it will appear at image distance 58 to be a large percentage of the field of view represented by rectangle 59 and at image distance 60 a smaller percentage of its field of view represented by rectangle 61. By noting the difference in circle size on a precalibrated overlay 62, shown in FIG. 7, one can readily determine the object distance from the lens which gives the magnification, and thus the actual physical dimension of the object being measured can be determined from physical measurement of the video screen image.

Thus, in FIG. 7 the defect 64 physically measures 1.5 inches across and the ring 66 indicates a magnification of 18. Therefore, the defect actually is 0.083 inches across in the 20 object being viewed. If the dotted line ring 66' were used, a magnification of ten would be shown, resulting in an actual size of 0.150 inches. Similarly in FIG. 4 the defect 30 measures 1.5 inches on the display screen and the shadow 26' indicates a magnification of six so the actual size of defect 30 in the object being viewed is 0.245 inches.

Figure 4:
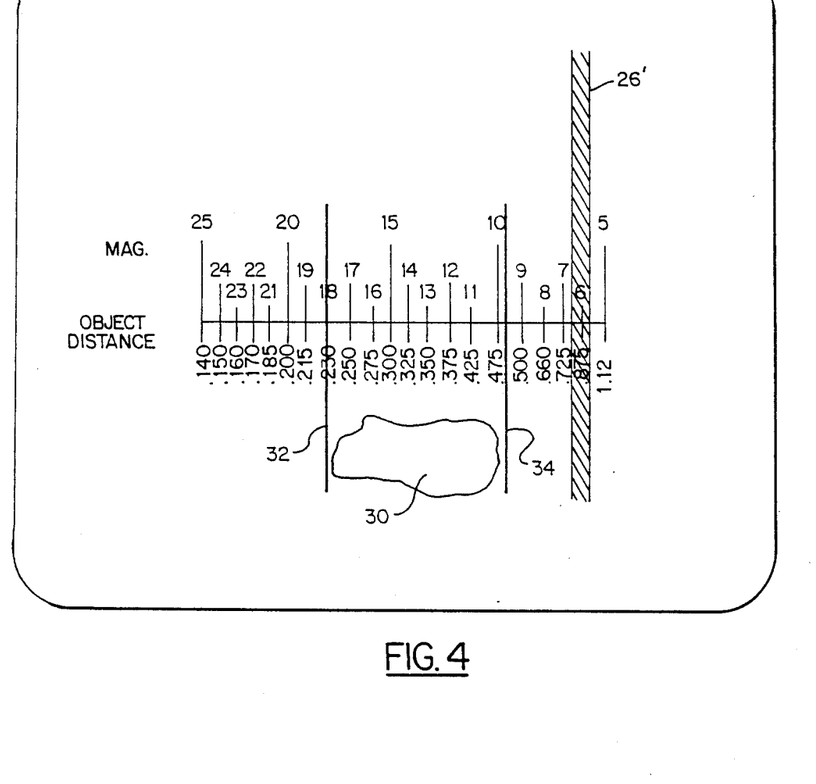
FIG. 4 is a display screen similar to FIG. 3 with an object to be measured showing electronic cursors for measurement of the object to be measured.

In FIG. 4 this can also be determined directly from the overlay by noting the object distance at each end of the defect and subtracting one from the other. This, of course, assumes that the object is in a plane essentially perpendicular to the axis of the video imager channel 14 optical lens system.

Figure 2:
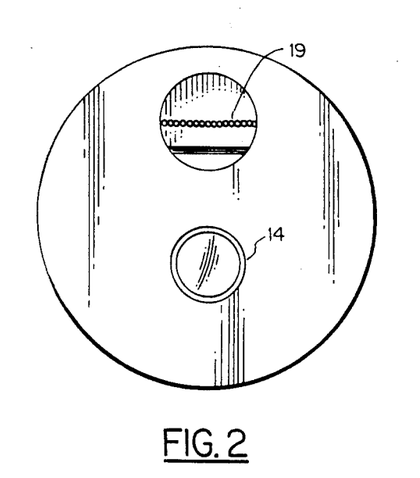
FIG. 2 is an enlarged end view of the imager head of the borescope of FIG. 1 in accordance with the present invention.

Again, the size of the ring can be measured electronically by counting pixels in a manner similar to that for the embodiment of FIGS. 1-3, and with cursors such as in FIG. 4 the size of the object can be determined automatically and displayed on the video screen.

The embodiment of FIGS. 5-7 has a further advantage in that it allows the construction of an extremely small diameter borescope insertion tube. For instance, in one preferred embodiment the video imager lens system has a diameter of approximately five millimeters. The optical fibers and the physical encapsulation of the fibers add about one more millimeter so that the total diameter of the borescope insertion tube becomes approximately six millimeters. This is considerably smaller in diameter than the system of FIG. 1 or other known systems today.

Figure 8A:
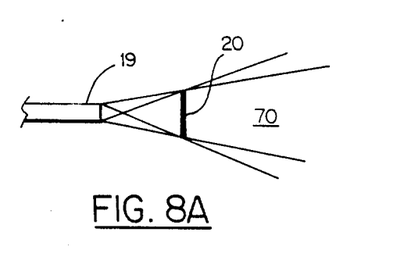
FIGS. 8A and 8B are diagrammatic showings of the shadow means of FIG. 1.
Figure 8B:
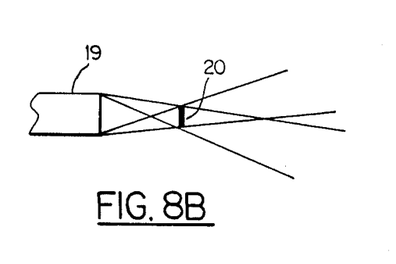

In the embodiment of FIGS. 1-3, the shadow bar 20 preferably is of a size slightly thicker than the thickness of the fiber optic strip 19 so that the shadow 70 cast on the screen will be a solid black shadow regardless of the distance from the image head within the depth of field of the borescope image system. (FIG. 8A). If the shadow strip 20 is narrower than the light source strip, it is possible that the shadow would be lost at a more distant object location. (See FIG. 8B).

Obviously the more dense and crisp the edge of the shadow is when projected on the object and on the display screen, the more accurately one can measure the objects under consideration. This relative size limitation is not encountered in FIGS. 5-7.

While this invention has been explained with reference to the structure disclosed herein, it is not confined to the details as set forth and this application is intended to cover any modifications and changes as may come within the scope of the following claims.

What is claimed is:

1. A device for measuring the size of objects viewed with a borescope comprising:
   a source of object illumination;
   contrasting shadow generating means operatively associated with said illumination source to project a contrasting shadow on the object to be viewed;
   image detecting means disposed adjacent said source of illumination to detect the image of the object to be viewed and the contrasting shadow;
   display means for viewing the image and shadow as detected by said image detecting means; and
   means for measuring parameters of the contrasting image on said display so that measurement of the object image on the display can be modified in proportion to its distance from the image detecting means.

2. A device for measuring the size of objects viewed with a borescope comprising:
   a source of object illumination including a thin strip of fiber optic material having a width substantially greater than its thickness;
   contrasting image generating means operatively associated with said illumination source to project a contrasting image on the object to be viewed;
   image detecting means disposed adjacent said source of illumination to detect the image of the object to be viewed and the contrasting image;
   display means for viewing the images as detected by said image detecting means; and
   means for measuring parameters of the contrasting image on said display so that measurement of the object image on the display can be modified in proportion to its distance from the image detecting means.

3. A device as described in claim 2 wherein said means for creating a contrasting image comprises a shadow bar positioned closely adjacent the end of said thin fiber optic strip and offset from the center line of the field of illumination of said strip so that a shadow line is created on the object being viewed and in the image thereof displayed on the display, and means for measuring the parameters of the contrasting image comprising a precalibrated scale overlaid on the display means adapted to measure the distance the shadow line is displaced from a zero point on said display means.

4. A device as described in claim 2 wherein said means for creating a contrasting image comprises a shadow bar positioned closely adjacent the end of said thin fiber optic strip and offset from the center line of the field of illumination so that a shadow line is created on the object being viewed and in the image thereof displayed on the display means.

5. A device as described in claim 4 wherein said shadow bar has a length equal to the fiber optic thin strip length and a width greater than the width of said fiber optic thin strip.

6. A device as described in claim 2 wherein said display means is a video display and said measuring means comprises circuit means for counting the pixels in the display screen from one edge thereof to the contrasting image displayed thereon.

7. A device as described in claim 6 further defined by said circuit means including cursors for locating the starting point of the pixel counting and the ending point so that pixels are counted only between two limiting cursor points on the display.

8. A device for measuring the size of objects viewed with a borescope comprising:
   a source of object illumination including an annular ring of fiber optic elements positioned about the image detecting means of the borescope;
   contrasting image generating means operatively associated with said source of illumination to project a contrasting image on the object to be viewed;
   image detecting means disposed adjacent said source of illumination to detect the image of the object to be viewed and the contrasting image;
   display means for viewing the images as detected by said image detecting means; and
   means for measuring parameters of the contrasting image on said display so that measurement of the object image on the display can be modified in proportion to its distance from the image detecting means.

9. A device as described in claim 8 wherein said means for creating a contrasting image comprises a source of coherent laser-like light projected through said annular ring of fiber optic elements to form a ring of constant diameter coherent laser-like light projected onto the object to be viewed.

10. A device as described in claim 8 wherein said means for creating a contrasting image comprises a source of coherent laser-like light projected through said annular ring of fiber optic elements to form a ring of constant diameter coherent laser-like light projected onto the object to be viewed, and said laser light is colored before projecting on the object to be viewed.

11. A device as described in claim 10 wherein said means for measuring the contrasting image parameters comprises a predetermined scale calibrated to the physical configuration of the borescope and overlaid on the display means so that the diameter of the contrasting image ring projected onto the object and displayed on said display means may be measured.

12. The method of measuring objects viewed on a display of a borescope having a general illumination source and an image detecting device mounted in the distal end of an insertion tube and a video display for viewing illuminated objects which comprises:
   illuminating the object to be measured by a source of general illumination;
   superimposing on the source of general illumination an auxiliary image for projection with the general illumination onto the object to be measured;
   causing the image detecting device to pick up said auxiliary image along with the image of the object to be measured and project them on a video display;
   causing at least one parameter of said contrasting image to change as it is viewed on said video display in proportion to the distance said object is from the image detecting device;
   measuring the image of the object on the video display;
   measuring the changing parameter of the contrasting image; and
   modifying the measurement of the object in accordance with the changing parameter measurement.

13. The method of measuring objects viewed on a display of a borescope having a general illumination source and an image detecting device mounted in the distal end of an insertion tube and a video display for viewing illuminated objects which comprises:

illuminating the object to be measured by a source of general illumination;
   creating a shadow line in said general illumination;
   projecting said shadow line and general illumination on the object to be measured;
   causing said image detecting device to present images of the object and shadow line on a video display;
   causing said shadow line at a first object distance to coincide with a first margin of the display means;
   causing said shadow line to move toward a second margin of the display means as the object distance is increased;
   measuring the image of the object on the video display;
   measuring the changing displacement of the contrasting image; and
   modifying the measurement of the object in accordance with the changing displacement measurement.

14. The method of claim 13 further defined by counting the number of pixels between the first margin of the display and the location of the shadow line on the display coresponding to said increased object distance.

15. The method of claim 13 for measuring the depth of a defect in the surface of an object which further comprises causing said shadow line to pass through the defect whose depth is to be measured; measuring the displacement of the line within the defect area as compared to the rest of the line; correlating the amount of displacement with the amount of movement of the borescope head relative to the object necessary to cause the shadow line to move that same distance; and translating this movement into a pre-calibrated scale overlay positioned over the display screen so that the depth of the defect can be measured.

16. The method of claim 13 further characterized by adjusting the position of the image detecting device of the borescope relative to the object to be measured so as to cause the shadow line to pass through the portion of the object to be measured at the desired measurement location; forming a calibrated transparent overlay for the video display means by comparing object distance versus shadow line over a plurality of points to form a displacement scale, calibrating said scale in terms of magnification and object distance in inches, determining the displacement of the shadow line in the segment to be measured from the rest of the line, reading the displacement distance from said calibrated transparent overlay.

17. The method of measuring objects viewed on a display of a borescope having a general illumination source and an image detecting device mounted in the distal end of an insertion tube and a video display for viewing illuminated objects which comprises:

illuminating the object to be measured by a source of general illumination;
   projecting a constant size image within the illumination source in the borescope head onto the objects to be measured;
   causing said image detecting device to present images of the object and constant size image on a video display;
   causing the size of said object to change when viewed on the display screen proportionally to the distance of the lens system from the object being viewed;
   measuring the size of the object being viewed on the video display; and
   modifying the measurement of the object in accordance with the change in size on the display of the constant size object image.

18. The method of claim 17 further defined by projecting a coherent laser-like light ring through the general illumination means of the borescope head so that the ring diameter remains constant in projection size, but the image thereof on the display screen will vary in proportion to the distance of the object being viewed from the borescope head.

19. In a borescope having an image viewing screen and an insertion tube including an image sensing head and an illumination source disposed in the distal end of said tube for viewing remote objects, object measuring means comprising:

a source of object illumination;
   auxiliary image creating means superimposed on the source of illumination for the borescope;
   said image creating means being disposed to cause the auxiliary image created to change at least one characteristic in proportion to the distance the object to be measured is from the image sensing head; and
   measuring means for determining the change in characteristic of said auxiliary image, so that the true physical size of the object to be measured can be determined from a measurement of the object image displayed on the image viewing screen and the measurement of the change in characteristic of said auxiliary image.

* * * * *